US011676195B1

(12) United States Patent
Erickson et al.

(10) Patent No.: US 11,676,195 B1
(45) Date of Patent: Jun. 13, 2023

(54) DIGITAL REPUTATION MANAGEMENT

(71) Applicant: United Services Automobile Association (USAA), San Antonio, TX (US)

(72) Inventors: Jennifer Hunt Erickson, San Antonio, TX (US); Bharat Prasad, San Antonio, TX (US); Snehal Desai, Richardson, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 150 days.

(21) Appl. No.: 17/183,025

(22) Filed: Feb. 23, 2021

Related U.S. Application Data

(62) Division of application No. 16/268,184, filed on Feb. 5, 2019, now Pat. No. 10,963,943.

(60) Provisional application No. 62/626,545, filed on Feb. 5, 2018.

(51) Int. Cl.
| | |
|---|---|
| *G06Q 30/06* | (2023.01) |
| *G06Q 20/34* | (2012.01) |
| *G06Q 30/02* | (2023.01) |
| *G06F 3/04847* | (2022.01) |
| *G06Q 30/0601* | (2023.01) |
| *G06Q 99/00* | (2006.01) |
| *G06Q 30/0251* | (2023.01) |
| *G06F 3/0482* | (2013.01) |
| *H04B 1/3827* | (2015.01) |

(52) U.S. Cl.
CPC ..... *G06Q 30/0631* (2013.01); *G06F 3/04847* (2013.01); *G06Q 30/0253* (2013.01); *G06Q 99/00* (2013.01); *G06F 3/0482* (2013.01); *G06Q 20/34* (2013.01); *G06Q 30/0251* (2013.01); *H04B 1/3827* (2013.01)

(58) Field of Classification Search
None
See application file for complete search history.

(56) References Cited

U.S. PATENT DOCUMENTS

| | | | |
|---|---|---|---|
| 8,126,904 B1 * | 2/2012 | Bettinger | G06Q 10/06 707/758 |
| 9,882,886 B1 * | 1/2018 | Kowshik | G06Q 30/0246 |
| 10,115,109 B2 * | 10/2018 | Sundaresan | G06Q 10/063 |
| 10,565,643 B2 * | 2/2020 | Rohn | G06Q 40/025 |

(Continued)

OTHER PUBLICATIONS

Strahilevitz, L.J., "Reputation Nation: Law in an Era of Ubiquitous Personal Information," Northwestern University Law Review 102.4 : 1667-1738. Northwestern University (on behalf of the School of Law). (Year: 2008).*

(Continued)

*Primary Examiner* — Nicholas D Rosen
(74) *Attorney, Agent, or Firm* — Perkins Coie LLP

(57) ABSTRACT

Embodiments described herein disclose methods and systems for managing a digital reputation of a user. The exemplary method can receive information about an item to be purchased by the user, determine in real-time or near real-time, based on one or more financial factors, a first digital reputation score indicative of an effect of the item on the user's digital reputation, determine an alternative item to be purchased instead of the item to be purchased, and determine a second digital reputation score based on the purchase of the alternative item.

20 Claims, 12 Drawing Sheets

(56) References Cited

U.S. PATENT DOCUMENTS

| | | | |
|---|---|---|---|
| 10,963,943 B1* | 3/2021 | Erickson | H04L 67/306 |
| 2014/0081681 A1* | 3/2014 | Sundaresan | G06Q 30/06 |
| | | | 705/7.11 |
| 2015/0339726 A1* | 11/2015 | Herring | G06Q 30/0261 |
| | | | 705/14.66 |
| 2017/0228820 A1* | 8/2017 | Rohn | G06Q 40/025 |

OTHER PUBLICATIONS

Wu, X., "Context-Aware Cloud Service Selection Model for Mobile Cloud Computing Environments," [Abstract only] Wireless Communications and Mobile Computing (Online) 2018, Hindawi Limited. (Year: 2018).*

* cited by examiner

Reputation Data Mapper – Publicly Viewable

| Data | Source | Current Use | Protect | Consumer | Impact |
|---|---|---|---|---|---|
| Birthday | Social Media | Marketing by Social Media | ⋮ | ⋮ | ⋮ |
| ⋮ | ⋮ | ⋮ | | | |

*FIG. 3A*

Reputation Data Mapper – Selective Access

| Data | Source | Current Use | Protect | Consumer | Impact |
|---|---|---|---|---|---|
| Credit Card | Online video subscription service | Entertainment | ⋮ | ⋮ | ⋮ |
| ⋮ | ⋮ | ⋮ | | | |

*FIG. 3B*

DIGITAL REPUTATION MANAGEMENT

CROSS-REFERENCE TO RELATED APPLICATIONS

This application is a division of U.S. patent application Ser. No. 16/268,184, filed on Feb. 5, 2019, entitled "DIGITAL REPUTATION MANAGEMENT," which claims priority to U.S. Provisional Application No. 62/626,545, filed on Feb. 5, 2018, entitled "DIGITAL REPUTATION MANAGEMENT SYSTEMS AND METHODS," both of which are hereby incorporated by reference in their entireties for all purposes.

BACKGROUND

In today's data driven world, individuals provide personal information about themselves with every digital interaction without ever realizing the consequences of providing personal information. Companies or organizations collect and analyze personal information obtained from individuals' digital interactions to form a comprehensive digital personal reputation about each of those individuals. A digital personal reputation may not only impact an individual's online, digital, or virtual presence but it may also impact that individual's real-life interactions. For example, if a consumer uses a credit card for a financial transaction, the consumer may not only hand over personal information in that transaction but may also hand over a way to track that consumer's behaviors. Attempts to prevent online, digital, or virtual presence by only avoiding credit card transactions may not be successful. For example, in a transaction involving only cash, a retailer may still be able to track purchases through rewards programs. The divulging of personal information may not be optional or transparent to the consumer. This personal information may be used by marketers, retailers, or financial institutions in a manner unapproved by the individuals. Individuals do not have a say in who has access to their personal information, how their personal information was obtained, and how their personal information will be used. Thus, individuals are not able to properly identify and control their personal information collected by companies or organizations.

BRIEF DESCRIPTION OF THE DRAWINGS

FIGS. 3A-3B show embodiments of a reputation data mapper application.

Figure 1A:
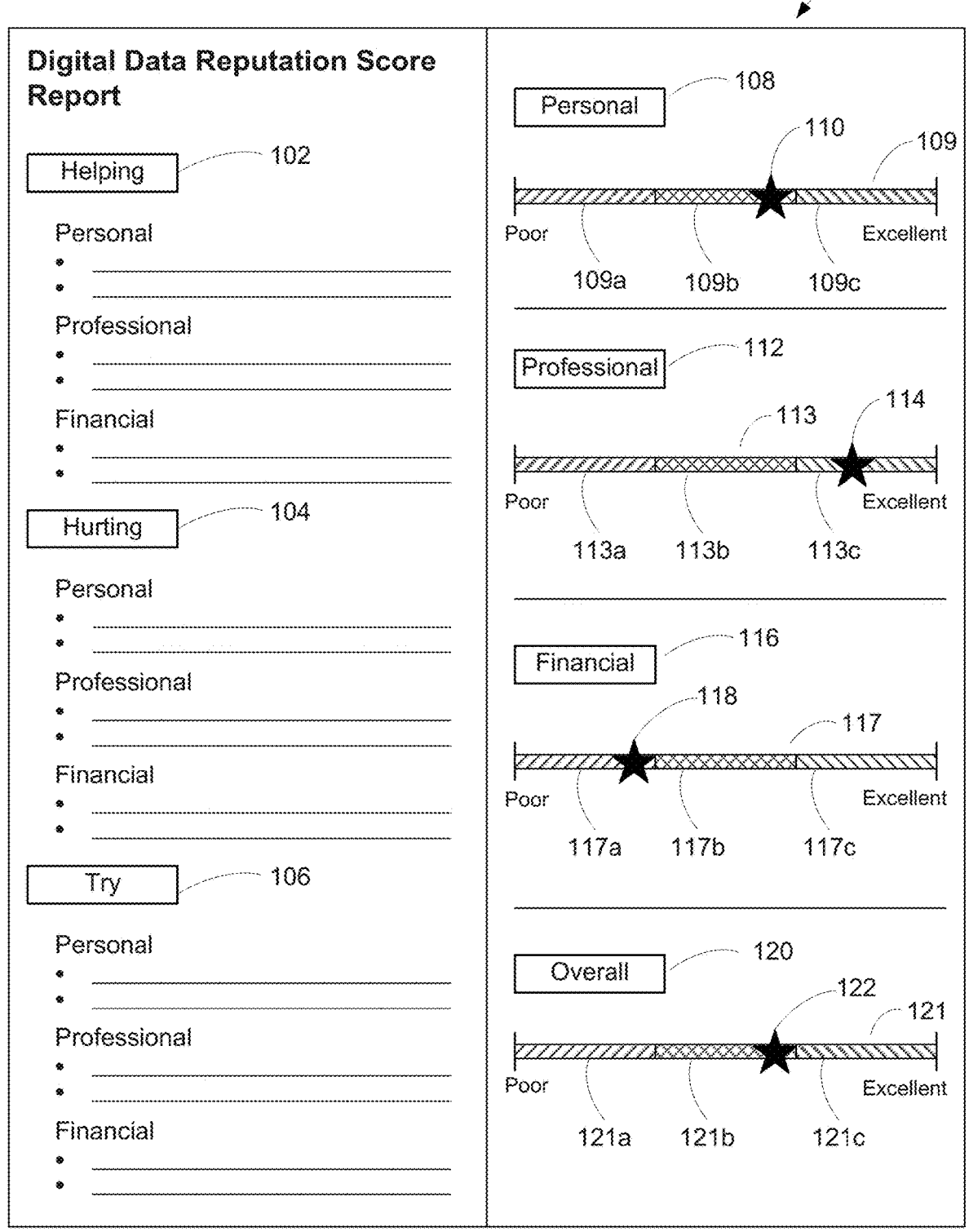
FIG. 1A shows an example of a digital data reputation score report.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

An individual's digital reputation can be used to determine various aspects of that individual's life. For example, an individual's financial abilities such as credit worthiness can be determined not only from his or her payment history, but it can also be determined by that individual's behavior data. A person may be deemed capable or trustworthy based not only on face-to-face interactions, but also by his or her digital interactions. For instance, while an individual's professional credibility can be based on traditional publications or speaking engagements at conferences, that individual's professional credibility can also be determined by his or her global reach or the number of followers following that individual on social media platforms such as on LinkedIn.

The embodiments disclosed in this document can be used by individuals to control or improve their digital reputation. For example, the various embodiments can allow individuals to determine who has access to their personal information, how such personal information was obtained, how the personal information will be used, or how to improve their digital reputation. As further described in the sections below, in some embodiments, a digital data reputation platform may include any one or more of a digital data reputation score report, a reputation shopper application, a reputation data mapper application, and a reputation data masker application.

Digital Data Reputation Score Report

FIG. 1A shows an embodiment of a digital data reputation score report 100 that can provide an individual with his or her reputation related information. As further described in the sections below, the digital data reputation platform can generate the digital data reputation score report 100. The digital data reputation platform can provide an individual with the tools needed to determine what personal data is being mined from the individual, how that personal data is being used, or how the individual provided that personal data. The individual can use this information to determine whether he or she should alter behavior to either stop providing the personal data or alter the data to improve his or her reputation in a desired way.

In some implementations, the digital data reputation score report 100 can include a data driven score comprised of one or more facets about the individual. For example, as shown on the right hand side of FIG. 1A, the digital data reputation score report 100 can include a personal facet 108, a professional facet 112, and a financial facet 116. The personal, professional, and financial facets can describe an individual's personal reputation, professional reputation, and financial reputation, respectively. In some implementations, a digital reputation score for each facet can be indicated with marker 110 on a line or bar 109. In some implementations, the line or bar 109 may include colors that can indicate a range of digital reputation scores that can be characterized as poor 109a, moderate 109b, or excellent 109c. As an example, a marker 109 shown in the moderate digital reputation score section 109b indicates that a user's personal reputation is moderate. The professional and financial facets may also include line or bar 113, 117 that can be used to characterize a user's reputation for those facets. In some implementations, the line or bar 113, 117 may include colors that can indicate a range of digital reputation scores that can be characterized as poor 113a, 117a, moderate 113b, 117b, or excellent 113c, 117c. As shown as an example, the markers 114 and 118 indicate that the user's professional reputation is excellent but that his financial reputation is poor.

Each facet's score can be determined by data received by the digital data reputation platform from any one or more of numerous sources available on the internet, through retailers, solicitors, social media, publications, self-published content, credit card information, online shopping data, web history, or any other digital data store that can be obtained either thru digital mining or through the user's consent. The user can provide the digital data reputation platform with personal information such as home or office address, social media account logins, bank accounts, social security number, or credit report information. In some implementations, the user's digital reputation score can be determined by the digital data reputation platform by scanning internet websites for reputational information related to the user, analyzing the reputational information based at least in part on a set of keywords, scoring the reputational information based at least in part on a set of keywords specific to each website.

As an example, a user's personal digital reputation score may be determined by the number of friends that the user has on social media, the user's social media postings, or any publicly available information about the user. In another example, a user's professional digital reputation score may be determined by the number of connections that the user has on professional social media websites, the user's speaking engagements, conference attendance, publications, or any other publicly available information. In yet another example, the digital data reputation platform can determine a user's financial digital reputation score based on one or more financial factors. As an example, the one or more financial factors may include the user's spending habits (e.g., brands, method of payment, frequency of purchase, chosen retailer, location of purchase), the user's saving habit, the user's age, the user's income, the user's shopping subscriptions, the user's social media postings, the user's bankruptcies, or publicly available information. In some embodiments, a user's score can also be affected by other facets. For example, if the user frequently purchases lumber and they also obtain income from items made and sold from lumber, lumber purchases might positively affect their financial score. However, if the lumber purchases are for a hobby or project and no known income is associated with that purchase, the lumber purchases might have no effect or a negative effect on the financial score. The score determination can provide as comprehensive a view of the user as possible using all the available data sources in relation to each other and can create correlations based on known behavior models such as those that might be derived from machine learning.

In some implementations, the digital data reputation platform can determine whether a digital reputation score is poor, moderate, or excellent based on whether the digital reputation score is within certain predetermined ranges. For example, a digital data reputation platform may consider digital reputation scores of 0-33 as poor scores, 34-66 as moderate scores, and 67-100 as excellent scores. In some other implementations, the digital data reputation platform can determine whether the digital reputation score is above or below a threshold to characterize the score as poor, moderate, or excellent.

In some implementations, the user can adjust the weight each facet plays on the overall score shown in section 120 based on which facet is more important to the user. The overall digital data reputation score can be comprised of the scores from the facets and what weight each facet has on the overall score can be customized by the user if they chose to focus on certain facets over others. The overall score section 120 may include line or bar 121 that can be used to characterize a user's overall digital reputation score. In some implementations, the line or bar 121 may include colors that can indicate a range of digital reputation scores that can be characterized as poor 121a, moderate 121b, or excellent 121c. As shown as an example, based on the weight assigned by the user to each facet, the marker 122 indicates that the user's overall reputation is moderate In some implementations, as shown on the left-hand side of FIG. 1A, the user can be provided with a summary of what activities or personal data are helping the digital reputation score section 102, hurting the digital reputation score section 104, and are recommended for the user section 106 for each facet. The activities recommended for the user section provides an activity or activities to try to improve his or her digital reputation score in the various facets. The summary can be provided for each facet, such as the personal, professional, and financial facets as shown in sections 102-106 in FIG. 1A. Sections 102-106 can also provide information such as what personal data may be contributing to the score and that data's likely source. In some implementations, sections 106 can also provide information about how to secure the data source.

The digital reputation score can help a user see what aspects of their personality dominate and learn what they can do to adjust that perception, if desired by the user. For example, one user's reputation is deemed by the digital data reputation score report 100 to be a conservative professional with little social life. This can be indicated by a poor digital reputation score for the personal facet 108 and a moderate to excellent digital reputation score for the professional facet 112. However, if such a user would prefer to be viewed as more creative with a strong presence in the Sci-Fi community then higher scores in different facets may be desirable. The digital data reputation score report 100 can identify in the recommend for user section 106 the activities or behaviors that the user may have to do to have a greater presence in the Sci-Fi community. As another example, if a user prefers to be viewed as an artist or a humanitarian, the user may use the digital data reputation platform to select his or her idols such as Taylor Swift or Mother Teresa. The platform can receive such information and can recommend the activities that the user may want to pursue to improve his or her digital reputation score to more like his or her idol.

User data for the reputation platform can be gathered and harvested in a number of ways. The least desirable method is expecting the user to input this as most often such models will fail due to lack of adoption and the burden of data entry. As a result, autonomous data gathering is preferable. Reputation data for personal facet could be obtained by gathering data from intelligent sensors (real and virtual), e.g., emotion detection, conversational AI and machine learning techniques to determine mood and behavior of conversation. Personal behavior such as community help, volunteering, and such can be gathered by external data sources that capture them. Financial facet reputation related data can be obtained from external systems as well as edge devices such as a mobile phone, a smart watch, etc. Professional facet data come be obtained from external data sources, community ratings (e.g., LinkedIn), social media, and professional engagements (conferences, speaking engagements, influencers, etc.).

The collected data can become fodder for AI and machine learning to understand and benchmark characteristics and threshold ranges for each category to determine when a user is allowed or should be recommended to be included as part of a community (e.g., Sci-Fi). This data model continuously changes as more people are on boarded and their multifaceted reputation data is harvested over time and new learnings are gathered.

Figure 1B:
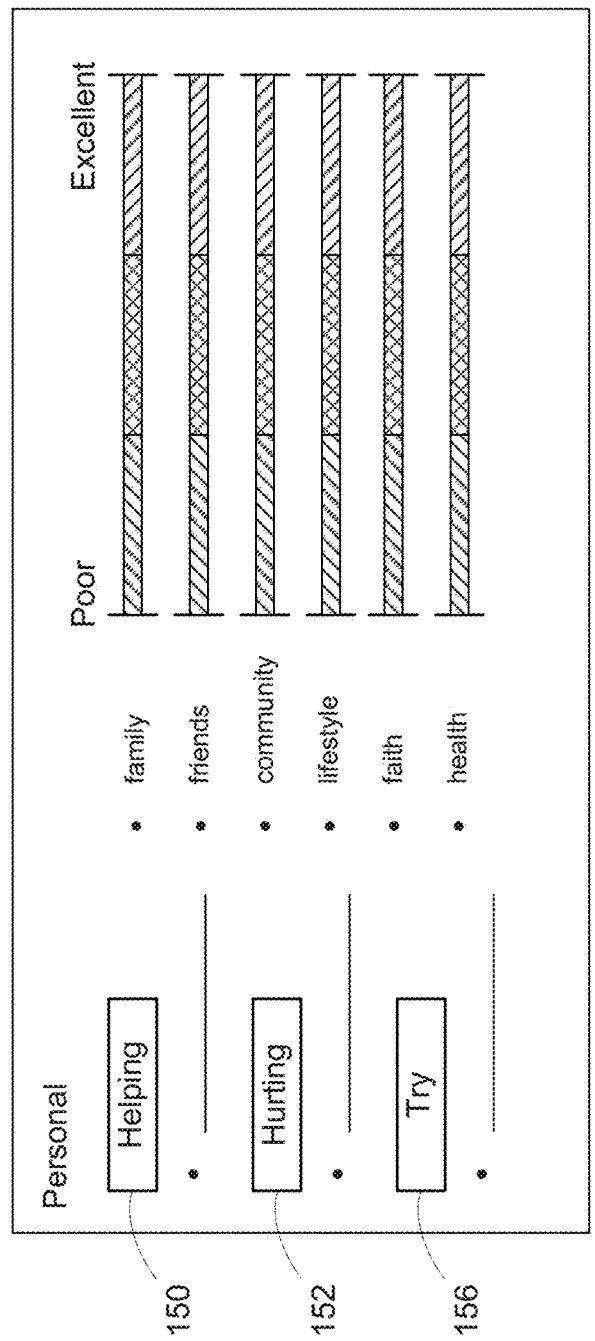
FIGS. 1B-1D show the reputation sub-scores associated with various facets that can be selected by a user.

FIG. 1B illustrates that the personal facet score can include sub-scores to characterize one or more personal attributes of an individual. As shown in FIG. 1B, some examples of personal attributes may include family, friends, community, lifestyle, faith, and health. In some implementations the various listed personal attributes may be selected by the user. The personal facet can provide the user with a view of themselves that is closest to how others in the user's family and social circle characterize that individual. An example of an item listed in the helping section 150 may be a user's gym membership that may have increased the user's personal digital reputation score for friends because the digital data reputation platform determines that there was an increase in the user's friends on social media after the user joined the gym. In the hurting section 152, the user may be informed of a behavior or habit, such as gambling, that may hurt his or her personal digital reputation score. In the recommended for user section 156, an example recommendation for how to stop data leaks in the personal facet might be to alter the user's security setting on social media applications. Another example of a recommendation to alter behavior might be to stop using Facebook and switch to Twitter because a majority of the user's personal circle have migrated activity to Twitter. Yet another example of new behavior to try might be to make a public donation to a certain non-profit because the digital data on that user indicates that type of content is likely to improve the user's social or community standing.

Figure 1C:
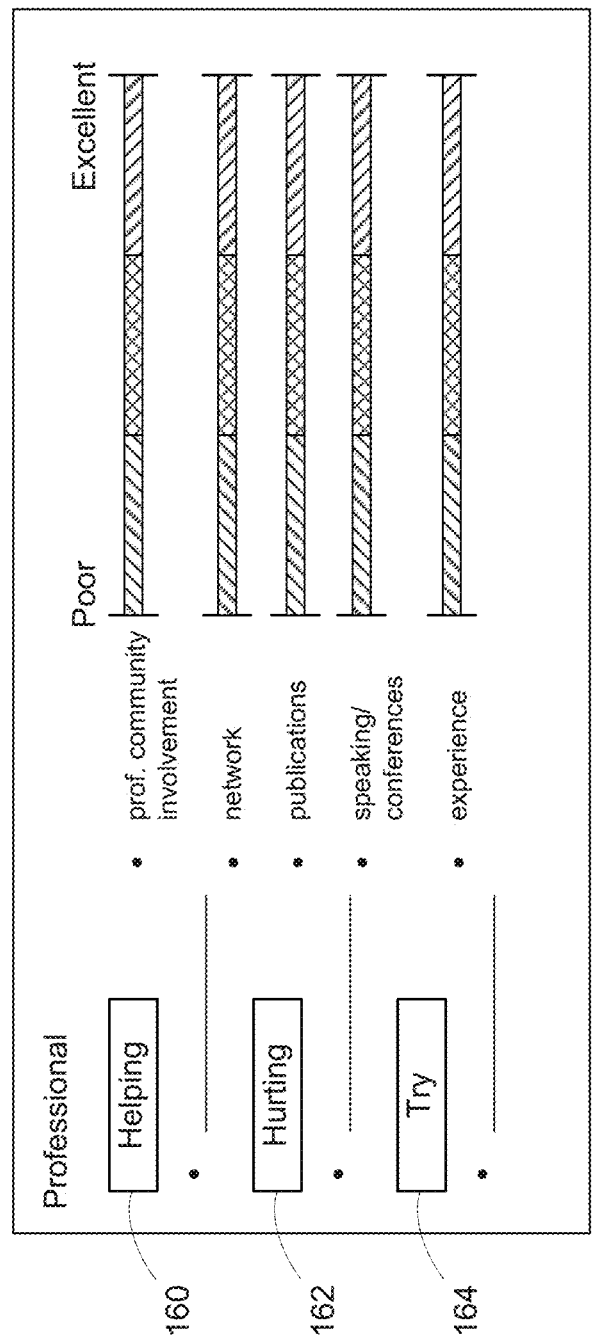

FIG. 1C illustrates that the professional facet score can include sub-scores to characterize one or more professional attributes of an individual. The professional facet score can characterize an individual's professional life including, for example, the user's presence in their respective professional community, the prestige and depth or breadth of the user's network, existence and consumption of physical or electronic publications, speaking engagements or conferences, number of professional recommendations, and perceived professional experience. In the recommended for user section 164, an example of a suggestion on how to reduce data leaks may include to order publications using the office address instead of the user's home address. Another example on how to alter behavior might be to alter the user's online professional profile, like one you might find on LinkedIn. Yet another example of a new behavior the application might recommend would include attending a new conference or writing a professional blog to build professional credibility.

Figure 1D:
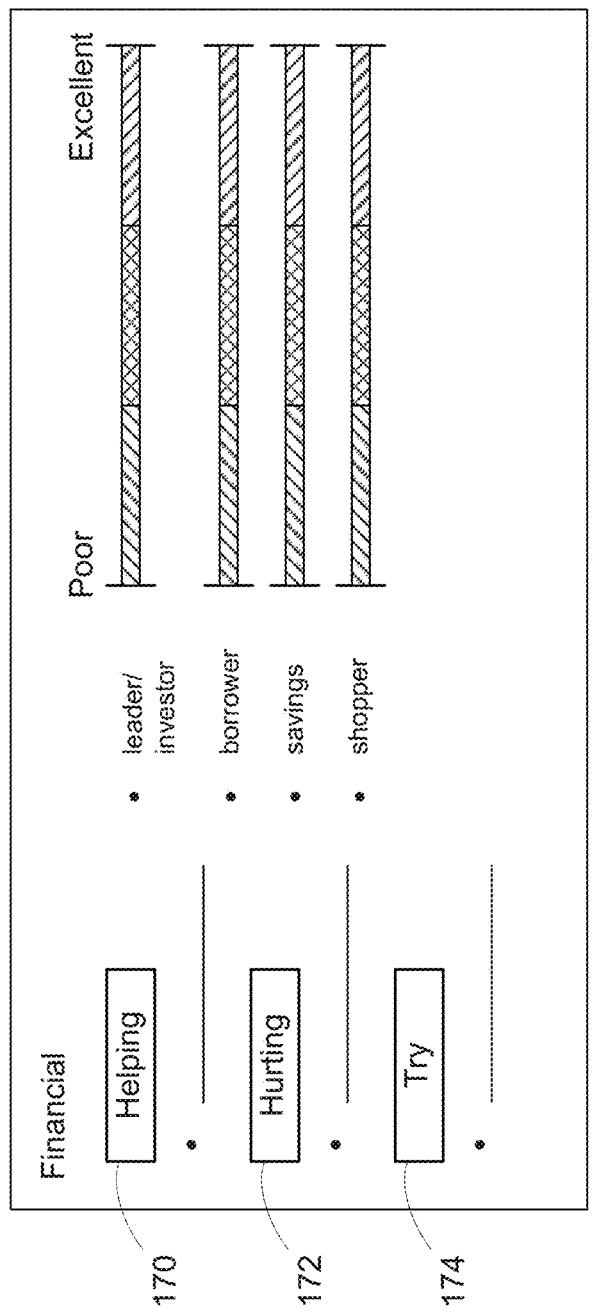

FIG. 1D illustrates that the financial facet score can include sub-scores to characterize one or more financial attributes of an individual. The financial facet score characterizes the user's financial attributes as a potential lender, borrower, investor, or overall financial stability. The financial facet can tell the user what their spending, saving, and investing habits say about them. For example, the financial facet score and associated sections 170-174 can inform a user whether he or she is taking on the appropriate level of risk to match their income, age, or other factors. The financial facet can make recommendations of what behaviors to continue, stop, or try to improve one's financial security. In some implementations, the financial facet may be used to provide more than basic financial advice and provide information such as altering consumer behaviors. For example, a user may, based on his or her purchases, be recommended to stop shopping at one store and shop at another store instead. As another example, the digital data reputation platform may recommend a user to reduce the number of online shopping subscription. In yet another example, a user may be recommended to try something new such as to increase spending on one type of credit card and reduce spending on another type of credit card to improve the rewards received by the user's credit card usage. The digital data reputation platform may also identify financial data leaks. For example, the system may recommend that the user use Apple pay or cash at a store that sells the user's purchase data based on usage of a rewards account.

In some implementations, the digital data reputation platform (shown as 464 in FIG. 4) can be an online or mobile application solution that analyzes the digital footprints of a consumer to gather digital data about that consumer that can range from the consumer's purchasing and payment behavior to the consumer's social media and digital publication behavior. The digital data reputation score report 100 shown in FIG. 1A may be provided to the user through a web browser, through a mobile application, or in an e-mail message. The digital data about a consumer can include both data that is provide by the consumer as well as data that is created by other parties about the consumer. The digital data reputation platform analyzes the available data to create a digital reputation score broken down into one or more facets, such as personal, professional, or financial.

In some embodiments, in addition to assessing the overall health of an individual's digital data reputation, the digital data reputation platform can also reveal to the consumer the website or online service where certain personal data is most accessible, how that personal data became visible, or how that personal data can impacting the overall score or the score of the one or more facets. An example of the platform disclosing how personal data because visible may include a consumer's Amazon purchases that were tracked because the consumer used a credit card and that transaction data was mined. As discussed above for sections 102-106 of FIG. 1A, the digital data reputation platform can also make recommendations for how the user can stop or reduce data leaks, change existing behavior to improve the data's impact on the score, or try a new behavior to improve the digital data reputation score.

In some implementations, the digital data reputation platform can run one or more hypotheticals to simulate potential impacts to the score based on certain behaviors.

In some embodiments, the digital data reputation platform can use machine learning to develop an overall picture of the various digital reputations with indications of what activities put users in which categories. Such information can be determined by looking at the digital information for many people (e.g., people in a work environment, city, town state, country) and harvesting the data and using machine learning to refine the activities that place the digital data reputation of people in one category or another. Thus, the user can be provided information regarding the general population and where the user's reputation fits in based on the available digital data.

Reputation Shopper Application

Figure 2A:
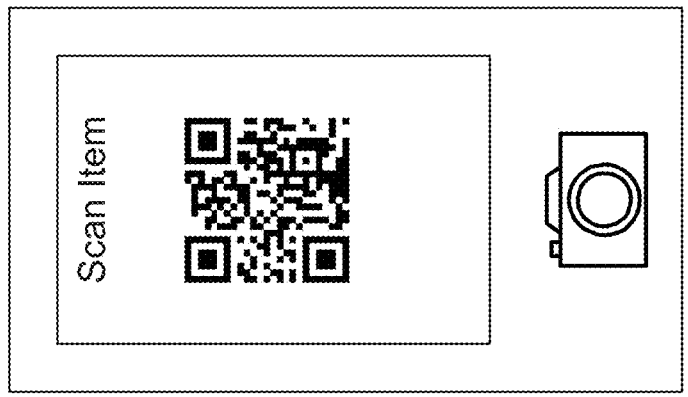
FIGS. 2A-2C show embodiments of a reputation shopper application.
Figure 2B:
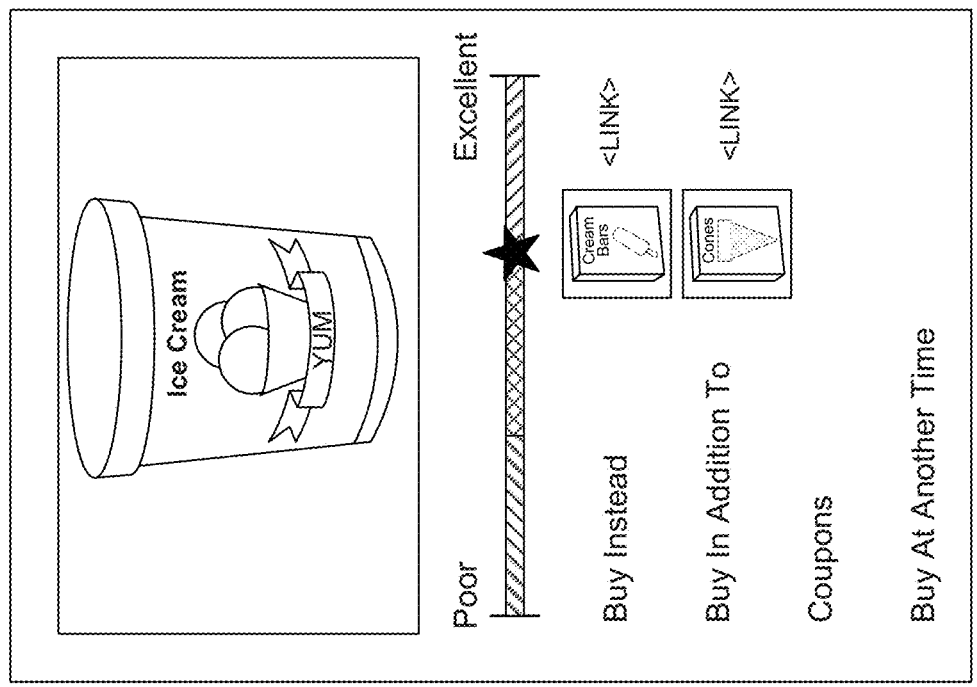
Figure 2C:
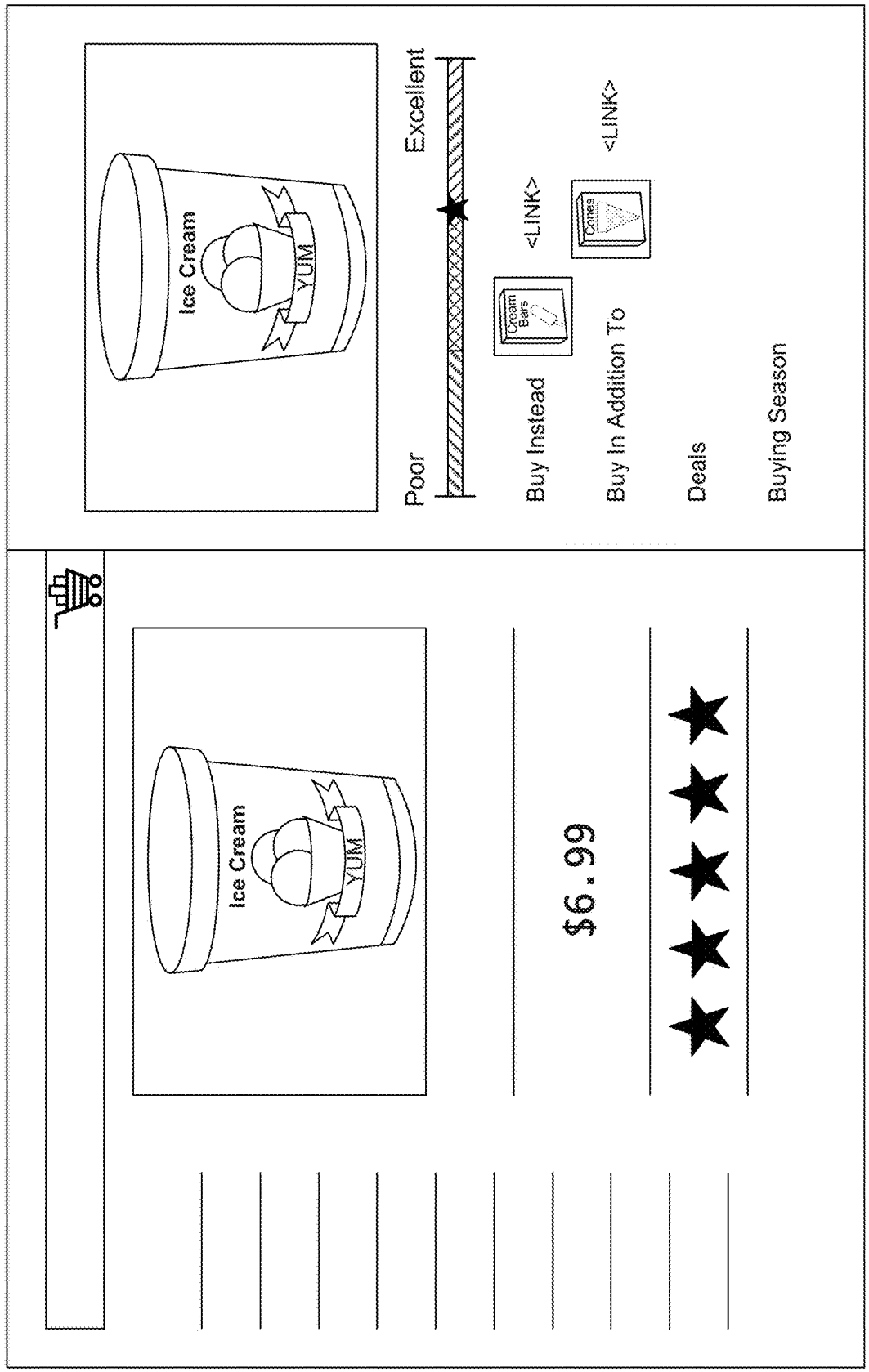

FIGS. 2A-2C show embodiments of a reputation shopper application that can be implemented on a mobile application or a web browser. The reputation shopper application can help consumers in their shopping habits to inform and guide them on how their shopping habits may impact their reputation. In some implementations, a consumer may use a mobile application on a portable electronic device to scan the item for an in-person purchase as shown in FIG. 2A. The consumer can scan the item for purchase by scanning the bar code on the item or by taking a picture or a photo of the item. In some other implementations, the consumer may use a web browser or the mobile application to add the item to their online shopping cart as shown in FIG. 2C.

FIG. 2B illustrates that the reputation shopper application can inform the consumer of the impact or effect, if any, of the item to be purchased on the consumer's digital reputation score. For example, the reputation shopper application can use the digital data reputation score platform to determine whether the item to be purchased, such as the ice cream shown in FIG. 2B, results in a higher, lower, or the same financial digital reputation score based on one or more financial factors as discussed in this document. In some implementations, the reputation shopper application can determine in real-time or near real-time the effect of the item to be purchased on the consumer's digital reputation score. The term "real-time" means instantaneously or near instantaneously (e.g., within milliseconds) and "near real-time" means within a few hours. In some cases, an item selected by the consumer to purchase may affect one or more facets.

The reputation shopper application can also can recommend a substitute or alternative item that may be more favorable to their digital reputation score. The information about alternative item may be provided with a hyperlink. A substitute or alternative item may be more favorable to a user's financial digital reputation score if it is sold at a lower price by another vendor or implies favorable behavior (e.g., responsibility) based on factors such as machine learning findings. For example, as shown in FIG. 2B, if a user adds ice cream to his or her list of items to purchase, the reputation shopper application on a portable electronic device can communicate with a server to determine a same or similar ice cream, for example, ice cream bars, that is priced lower than the ice cream selected by the user for purchase. The portable electronic device can receive hyperlinked information about the alternative item, if any, from the server and then display the alternative item.

In some implementations, a server can determine whether to recommend a substitute or alternative item for purchase by determining a second digital reputation score based on the alternative item for purchase. The second digital reputation score can be based on one or more financial factors as discussed in this document and the alternative item for purchase. As an example, if the server determines that the second digital reputation score is greater or higher than the first digital reputation score, the server can recommend the alternative item to be displayed by the reputation shopper application. In some embodiments, the digital reputation score associated with the alternative item can also be displayed to the user using, for example, a portable electronic device. In another example, if the user purchases furniture protectors, the reputation shopper can use past correlations derived from behavior patterns obtained via mechanisms like machine learning to determine that the user's reputation score would be improved if they, say, also bought another item such as sandpaper because people who purchase those two items together are known to be more responsible home owners and have a lower financial risk to banks and other potential lenders. The tool would then make the recommendation to purchase the complimentary item.

In some implementations, the reputation shopper application may also provide information about complementary purchases that may be combined with the item that the consumer wants to purchase to enhance the consumer's digital reputation score. The information about complementary purchases may be provided with a hyperlink. Continuing with the example discussed above, the reputation shopper application on a personal electronic device can receive from a server and display hyperlinked information about a recommended complementary ice cream cones that can be used with the ice cream.

In some embodiments, the reputation shopper application may provide to the user one or more coupons to use with the item that the consumer wants to purchase. In some implementations, the coupons may be provided by a server to a portable electronic device. In some other embodiments, the coupons may also be provided for the alternative or complementary items. Further, the reputation shopper application may also be able to determine whether a user's can delay his or her purchase to get a get a better deal using, for example, the "buy at another time" feature. For example, if a user wants to purchase a television in October and has added the television to the reputation shopper application, the server may determine that televisions tend to be on sale at the end of November and may send this information to the portable electronic device to display to the user that the user may want to delay the purchase until the end of November. Continuing with this example, in some implementations, a server may determine that an alternative time is available to purchase an item if the alternative time results in a higher digital reputation score.

In some embodiments, the reputation shopper application may also provide to the user an alternative location to purchase the item selected to be purchased by the user. As an example, a server can determine a first location of the user based on information gathered from the user's portable electronic device. The server can determine an alternative location to purchaser the item based on the server determining that the user's purchase of the item at the alternative location results in a higher digital reputation score than if the user purchased the item at the first location (e.g., purchasing a product at a local store can result in a higher digital reputation score than at Wal-Mart).

In some implementations, data regarding the user's digital data reputation score and how the user wants to be viewed can be used by an organization to generate more targeted advertising. That is, by reviewing the user's digital data reputation score and how the user would like to be viewed, a server can determine that the user should not be offered products that the user traditionally would have been offered and/or offered products that the user traditionally would have been offered.

In some embodiments, the digital data reputation information of a population and of the user can be used to help the user with other decisions such as recommending certain places to live such as neighborhoods, towns, cities, or states that fit the user's digital reputation or what the user wants for their digital reputation. In another example, an analysis of data can suggest where a particular business may thrive based on the population and other businesses that are in the area or missing from an area. That is, users can be matched to communities, businesses, friends, entertainment, or other facets of life based on the digital data reputation of others.

Reputation Data Mapper Application

FIGS. 3A-3B show embodiments of a reputation data mapper application that can be implemented on a web browser or a mobile application. The reputation data mapper application can analyze the reputation data sources and can provide a view of what user data is accessible, by whom, how it is likely currently being used, how it might be used in the future and what the impact of that data is or could be on the digital reputation score. In some implementations, reputation data mapper application includes a source column that can identify the source of the personal data leak. As an example, the source may include a name of a mobile application for which the user forgot to turn of sharing. In some implementations, the reputation data mapper application may analyze information similar to the information provided to the digital data reputation platform. Such information may include home or office address, credit card information and purchases, creditor report information, online shopping data, social media data, data from retailers, blog or media or publications, or other web data.

An example of various pieces of data is provided in FIGS. 3A-3B. In FIG. 3A, the reputation data mapper application indicates information that is publicly viewable such as a person's birthday that was obtained from the person's social media account. The current use column indicates what entity or entities use that information. For example, a person's birthday may be used by social media for marketing purposes. The protect column may allow the consumer to protect the data. Continuing with the example discussed above, if the person wants to remove his or her birthday information from the social media website, the reputation data mapper application can provide information about how to do so. The consumer column can provide information about potential additional third-parties that may use the data. Finally, the impact column provides information about the effect of the publicly viewable data on the user's reputation.

For instance, the impact column can provide a button which when clicked brings up a visual pop-up of the reports shown in FIGS. 1A and 1B. This way the reputation-mapper tool can provide a simulated view of the future impact on your scores for each of the line-items. For instance, the user can uncheck parameters, such as their LinkedIn profile, from being shared publicly and review the impact made on their professional reputation and their social network. Removing their LinkedIn profile may have a much larger impact on the user's professional reputation than the user's social network.

Furthermore, a clickable map icon can be provided in the impact column as well, which can bring up a US or a global map with potentially different reputation scores in different regions based on the same data set. For instance, Europe has stricter privacy controls than the US, and hiding/suppressing Personally Identifiable Information ("PII") such as social security number may not have a major impact on financial reputation scores in Europe, but could have a major impact in the US where a number of Know-Your-Customer (KYC) algorithms run by the major financial institutions rely on such data. In some embodiments, the system can generate and display histograms or other visuals that can change in real-time (e.g., rising, falling) as the user adjusts parameters back and forth.

In FIG. 3B, the reputation data mapper application provides information that is selectively accessible using, for example, a passkey or password. The data that is selectively accessible may include, for example, credit card information stored in the user's online subscription services. In FIG. 3B, the columns used to describe selective access may be the same as the ones used for publicly accessible information, as shown in FIG. 3A.

Reputation Data Masker Application

A reputation data masker application can provide the consumer with a mechanism to mask their payment data when making in person, online or digital purchases to prevent purchase information from being mapped back to the individual making the purchase from the credit card issuer. Purchase information can include the specific items or services purchased, where it was purchased, time it was purchased, among other things. In some implementations, the reputation data masker application may receive a signal from a credit card that informs the application that the user prefers to mask his or her information. As an example, a credit card (e.g., plastic credit card with a chip or virtual card in mobile wallet) may include a switch or a select option that a user can use to turn on or off the protect feature that allows the user to mask or unmask partial or all transaction information. When the reputation data masker application receives the signal from the credit card that the user has turned on the protect feature, the application can mask some or all of the information associated with the credit card transaction. In some embodiments, the credit card with the switch is a ghost card that is linked to the user's actual credit card. In this way, the transaction is charged to the ghost card and the system charges the user's actual credit card but provides only the information indicated by the switch or the application. The credit card related implementation can be applied to other cards, such as rewards cards, or mobile pay services. In some embodiments, the point of sale can ask the user the level of information the user would like to have shared.

Today the payment rails (VISA, MasterCard, etc.) and billing systems already perform a level of masking, e.g., the last 4 digits of credit card information is shown on public facing information. In the reputation data masker application, the last four digits could be integrated into the edge such as point of sale services, ATMs, or they could be part of the transaction flow in the backend systems where the reputation mask component is interjected for data outbound from these systems. User-configurable rules can be applied to any data shared to a public reputation system or dashboard and the data sent is masked accordingly. Data masking in some embodiments can also be a real-time interaction with the user at the time of publication, similar to receiving a text message on the user's phone, e.g.: "Your amazon TV purchase rating is being shared, text YES/NO to share your Full Name, if not Only your First name and Last initial will be shared."

Reputation services can be deployed where retailers, banks and other institutions can leverage and all the masking can occur behind these services (e.g., the cloud model). In a decentralized model such as blockchain, the reputation can be more tightly controlled by a user with greater clarity allowing more sophisticated interactions.

A benefit of masking the user's personal information is that it can prevent the purchased item's disclosure to a third-party, which may impact the user's digital reputation score. By masking personal information, the user may prevent breaches of privacy. As an example, when a user purchases a baby crib, the user may mask that information to prevent a store or a credit card company from knowing that someone in the user's household is pregnant. Another benefit of the reputation data masker application is that the users can choose to only allow the dissemination of certain information that help their reputation and exclude those that would hurt. For example, a health conscious user may allow the purchase of a gym membership to impact his or her digital reputation score, but may not want the purchase of a fast-food meal to impact his personal reputation.

Figure 4:
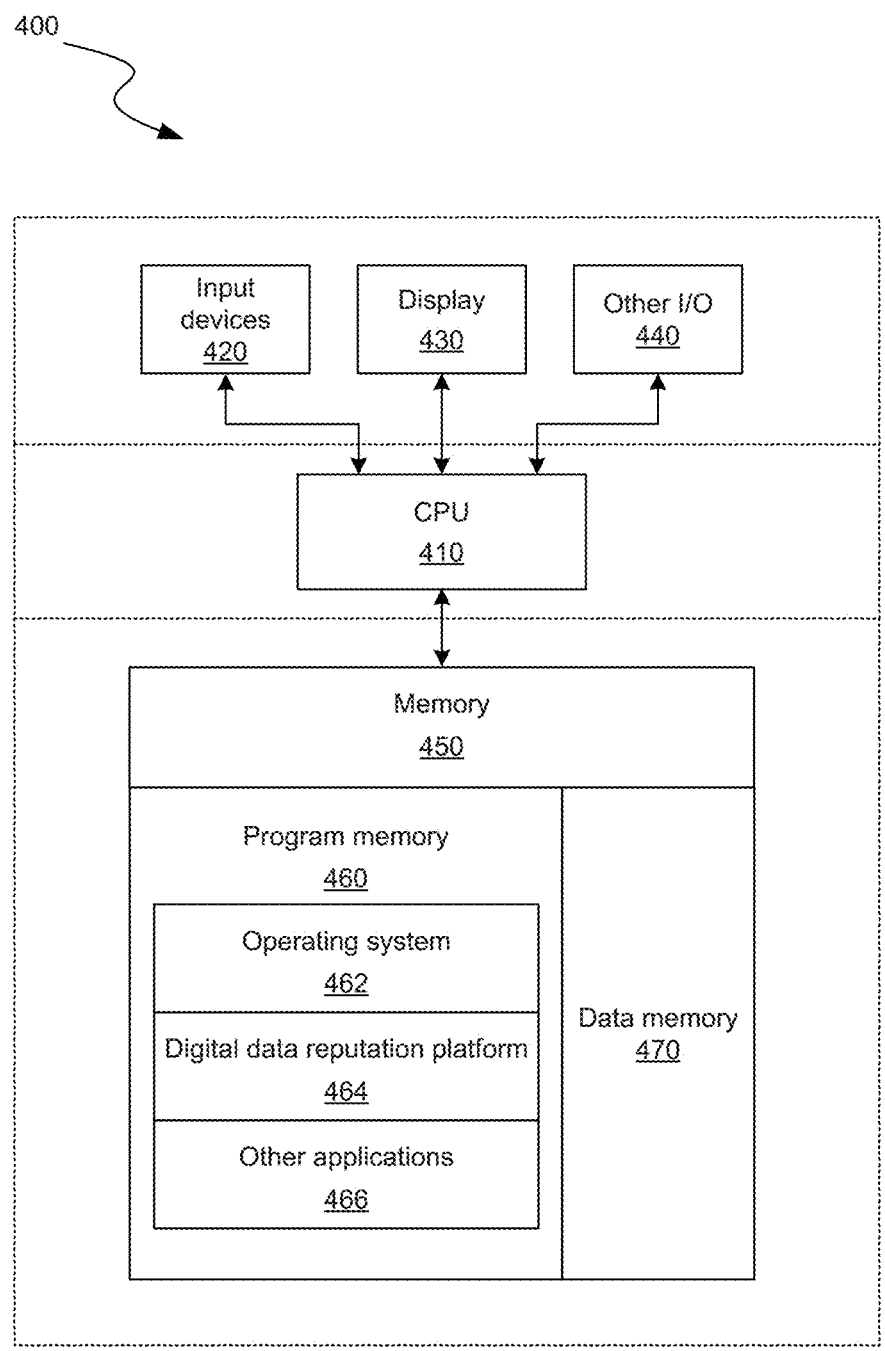
FIG. 4 is a block diagram illustrating an overview of devices on which some implementations can operate.

FIG. 4 is a block diagram illustrating an overview of devices on which some implementations of the disclosed technology can operate. The devices can comprise hardware components of a device 400 that manages the digital data reputation platform 464 that may include information associated with any one or more of a digital data reputation score report, a reputation shopper application, a reputation data mapper application, and a reputation data masker application. Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, digital data reputation platform 464, and other application programs 466. Memory 450 can also include data memory 470 that can include digital reputation scores for personal, professional, or financial aspects of a user, suggestions for the user to do or to continue doing an activity, suggestions for to user to stop doing an activity, effect of the user's planned purchase on the user's digital reputation score, suggestions for alternative or additional purchases, information about relevant coupons, recommendations for the user to delay his or her planned purchases, information about and control for personal information that is publicly viewable or is selectively accessed, etc., which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
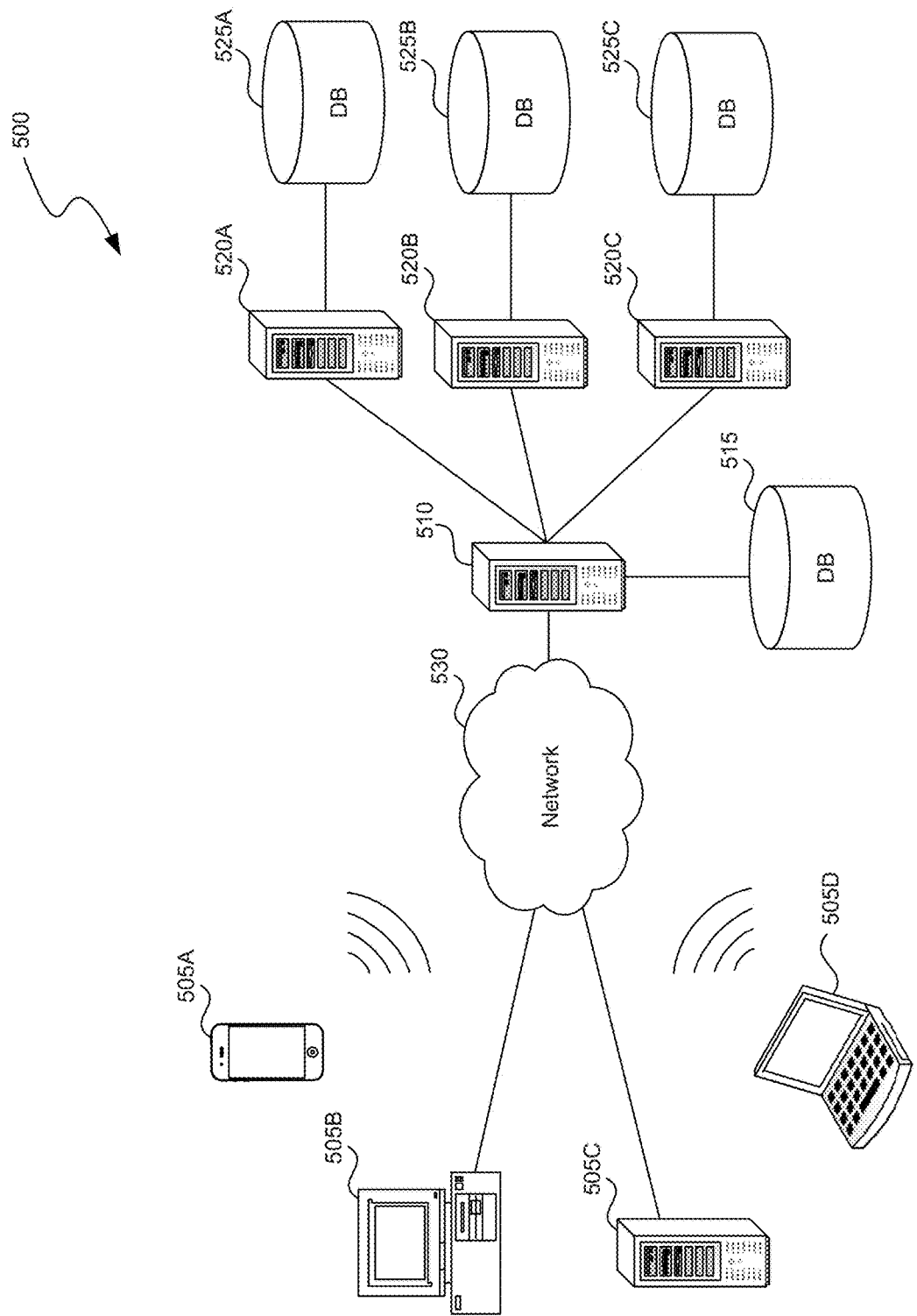
FIG. 5 is a block diagram illustrating an overview of an environment in which some implementations can operate.

FIG. 5 is a block diagram illustrating an overview of an environment 500 in which some implementations of the disclosed technology can operate. Environment 500 can include one or more client computing devices 505A-D, examples of which can include device 400. Client computing devices 505A-D can operate in a networked environment using logical connections through network 530 to one or more remote computers, such as a server computing device 510. As shown in FIG. 5, examples of client computing devices 505A-D may include a portable electronic device 505A, a computer 505B, a server 505C, or a laptop 505D.

In some implementations, server computing device 510 can be an edge server that receives client requests and coordinates fulfillment of those requests through other servers, such as servers 520A-C. Server computing devices 510 and 520A-C can comprise computing systems, such as device 400. Though each server computing device 510 and 520A-C is displayed logically as a single server, server computing devices can each be a distributed computing environment encompassing multiple computing devices located at the same or at geographically disparate physical locations. In some implementations, each server computing device 520 corresponds to a group of servers.

Client computing devices 505A-D and server computing devices 510 and 520A-C can each act as a server or client to other server/client devices. Server 510 can connect to a database 515. Servers 520A-C can each connect to a corresponding database 525A-C. As discussed above, each server 520 can correspond to a group of servers, and each of these servers can share a database or can have their own database. Databases 515 and 525 can warehouse (e.g., store) information such as digital reputation scores for personal, professional, or financial aspects of a user, suggestions for the user to do or to continue doing an activity, suggestions for to user to stop doing an activity, effect of the user's planned purchase on the user's digital reputation score, suggestions for alternative or additional purchases, information about relevant coupons, recommendations for the user to delay his or her planned purchases, information about and control for personal information that is publicly viewable or is selectively accessed. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and servers 520A-C are shown as separate connections, these connections can be any kind of local, wide area, wired, or wireless network, including network 530 or a separate public or private network.

Figure 6:
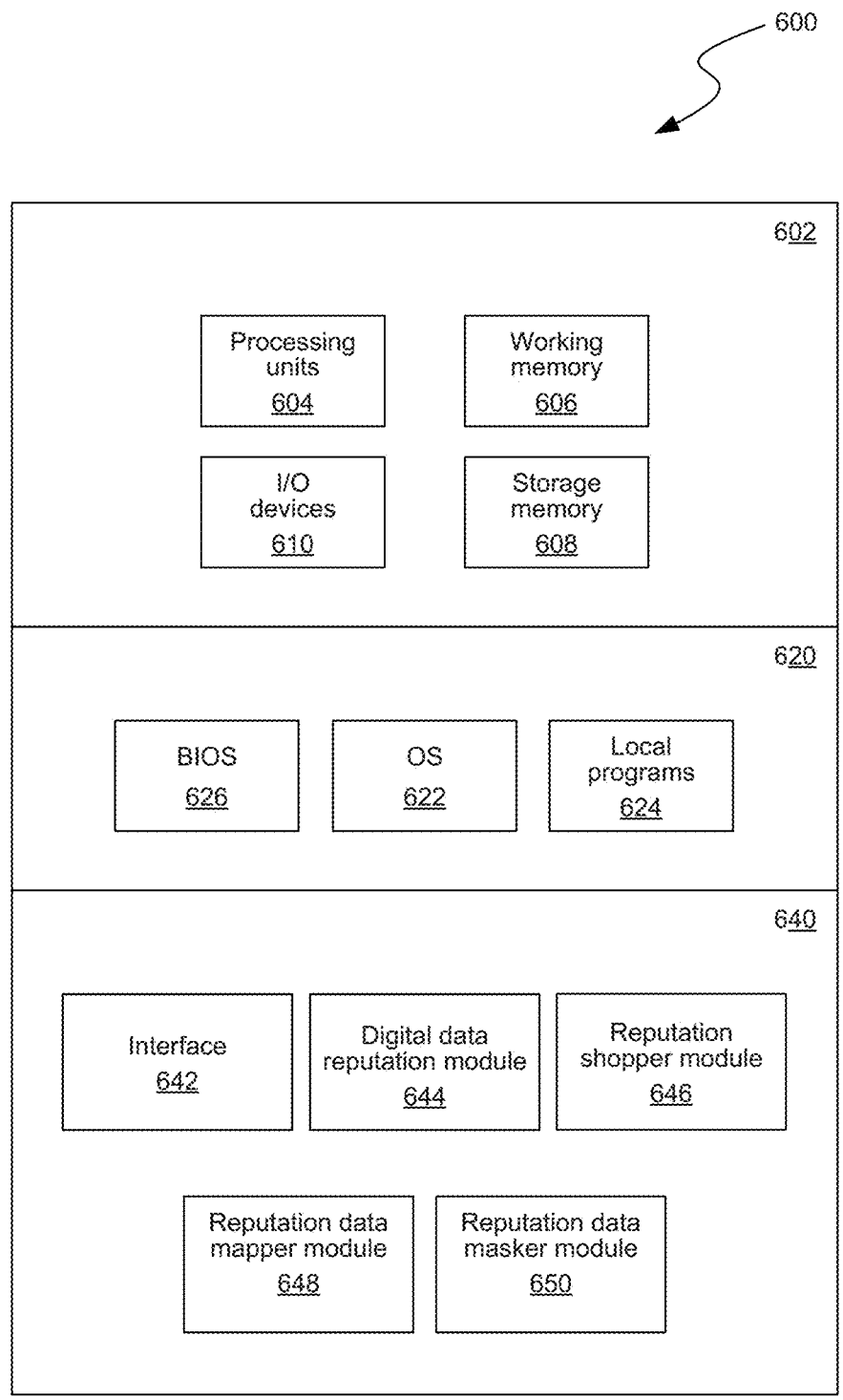
FIG. 6 is a block diagram illustrating components which, in some implementations, can be used in a system employing the disclosed technology.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware, including processing units 604 (e.g., CPUs, GPUs, APUs, etc.), working memory 606, storage memory 608, and input and output devices 610. Some or all of the components 600 can be implemented in a client computing device such as client computing devices 505A-D or on a server computing device, such as server computing device 510 or 520A-C. For example, a digital data reputation platform system may include a mobile application running on a mobile device and a remote server. The mobile application can be configured to collect information identifying an item for purchase, and send the information identifying the item for purchase to a remote server. The remote server can be configured to receive the information identifying the item for purchase, and generate a digital reputation score for a user, wherein the digital reputation score is based at least in part on the item. The digital reputation score can be generated by the remote server configured to scan internet websites for reputational information related to the user, analyze the reputational information based at least in part on a set of keywords, and score the reputational information based at least in part on a set of keywords specific to each website. The mobile application can be configured to receive the digital reputation score, and display, on a mobile device running the mobile application, the digital reputation score and indicate an impact of the item on the digital reputation score.

General software 620 can include various applications, including an operating system 622, local programs 624, and a basic input output system (BIOS) 626. Specialized components 640 can be subcomponents of a general software application 620, such as local programs 624. Specialized components 640 can include any one or more of digital data reputation module 644, reputation shopper module 646, reputation data mapper module 648, and reputation data masker module 650, and components that can be used for transferring data and controlling the specialized components, such as interface 642. In some implementations, components 600 can be in a computing system that is distributed across multiple computing devices or can be an interface to a server-based application executing one or more of specialized components 640.

The digital data reputation module 644 can perform the features associated with the digital data reputation score report as disclosed in this document. For example, digital data reputation module 644 can allow a user to select one or more facets to determine the user's digital reputation score for the selected one or more facets. As an example, digital data reputation module 644 can allow a user to select personal, professional, and financial facets. Based on such selection, the digital data reputation module 644 can determine the user's reputation for each facet. In some embodiments, the digital data reputation module 644 may determine the digital reputation score for each facet based on any one or more of sources available on the internet, through retailers, solicitors, social media, publications, self-published content, credit card information, online shopping data, web history, or any other digital data store that can be obtained either through digital mining or through the user's consent.

In some implementations, the digital data reputation module 644 can also determine a list of one or more activities or behaviors that are helping or hurting the user's digital reputation score for the one or more facets. Further, the digital data reputation module 644 can also recommend an additional list of one or more activities that may improve the user's digital reputation score for the one or more facets.

In some embodiments the digital data reputation module 644 can determine reputation sub-scores for the one or more facets selected by the user. For example, as shown in FIG. 1B, the digital data reputation module 644 can determine reputation sub-scores for the personal facet for family, friends, community, lifestyle, faith, and health.

The reputation shopper module 646 can perform the features associated with the reputation shopper application as disclosed in this document. For example, the reputation shopper module 646 can allow the user to scan or take a picture of an item that the user wants to purchase. When an item is added to be purchased, the reputation shopper module 646 can determine the effect of the item's purchase on the user's reputation. In some implementations, the reputation shopper module 646 can use the digital data reputation module 644 to determine the effect of the item to be purchased on the user's reputation. The reputation shopper module 646 can also recommend substitutes or alternatives for the user to purchase instead of the item that the user added to be purchased. In some implementations, the reputation shopper module 646 can recommend complementary items to purchase in addition to the item that the user wants to purchase. The reputation shopper module 646 can also recommend coupons for the item the user wants to purchase or determine a better time to purchase the item.

The reputation data mapper module 648 can perform the features associated with the reputation data mapper application as disclosed in this document. For example, the reputation data mapper module 648 can provide the user with a list of one or more personal information that is publicly viewable or is selectively accessible. For each personal information, the reputation data mapper module 648 can determine the score and current use. Further, the reputation data mapper module 648 can also recommend ways to protect that information. In some implementations, the reputation data mapper module 648 can provide information about the third-parties that may be using the user's personal information. Further, the reputation data mapper module 648 can also use the digital data reputation module 644 to characterize the impact of the publicly viewable or selectively accessible personal information on the user's digital reputation score.

The reputation data masker module 650 can perform the features associated with the reputation data masker application as disclosed in this document.

Those skilled in the art will appreciate that the components illustrated in FIGS. 4-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 7:
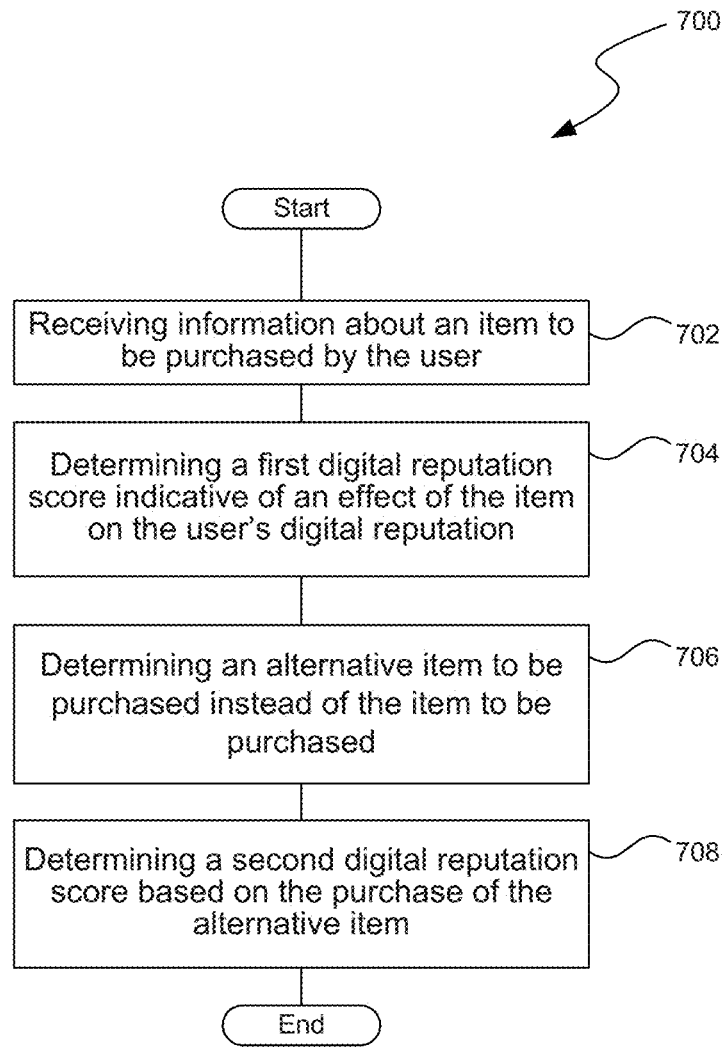
FIG. 7 is a flow diagram illustrating a process used in some implementations for managing a digital reputation of a user.

FIG. 7 is a flow diagram illustrating a set of operations 700 for managing a digital reputation of a user. In some embodiments, in this and other flow diagrams of operations, fewer than all of the operations in the set of operations are performed, whereas, in other embodiments, additional operations are performed. Moreover, in some embodiments, the operations may be performed in different orders or in parallel. The operations can be performed by components illustrated in FIGS. 4-7.

At the receiving operation 702, information is received about an item to be purchased by the user. In some embodiments, the received information can be collected via a portable electronic device. At the determining operation, a server can determine in real-time or near real-time, based on one or more financial factors, a first digital reputation score indicative of an effect of the item on the user's digital reputation. The first digital reputation score can be displayed to the user via the portable electronic device. At the second determining operation 706, the server can determine an alternative item to be purchased instead of the item to be purchased. The alternative item can be displayed to the user via the portable electronic device. At the fourth determining operation 708, the server can determine a second digital reputation score based on the purchase of the alternative item. The second digital reputation score can be displayed to the user via the portable electronic device.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list. The description and claims use "digital data reputation" and "digital reputation" interchangeably. The description and claims also use "digital data reputation score" and "digital reputation score" interchangeably.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A method of managing a digital reputation of a user by suggesting alternative purchases, the method comprising:
   collecting, via a portable electronic device, information identifying a first item for purchase, wherein the information identifying the first item is collected by at least one of: scanning a bar code on the first item, obtaining a photo of the first item, or collecting contents of a shopping cart including the first item;
   providing, to a remote server, the information identifying the first item for purchase, wherein the remote server determines a first digital reputation score indicative of a first effect of the first item on a digital reputation of the user;
   receiving the first digital reputation score indicative of the first effect of the first item on the digital reputation of the user;
   identifying, via the portable electronic device, information on an alternative item for purchase;
   sending, to the remote server, the information on the alternative item, wherein the remote server determines a second digital reputation score indicative of a second effect of the alternative item on the digital reputation of the user;
   receiving the second digital reputation score indicative of the second effect of the alternative item on the digital reputation of the user; and
   displaying, on the portable electronic device, the first digital reputation score and the second digital reputation score.

2. The method of claim 1, wherein the first and second digital reputation scores are displayed as markers on a line or bar that includes colors characterizing the first and second digital reputation scores.

3. The method of claim 2, wherein a green color characterizes a digital reputation score above a first threshold, a yellow color characterizes a digital reputation between the first threshold and a second threshold, and a red color characterizes a digital reputation score below the second threshold.

4. The method of claim 1, wherein the first and second digital reputation scores are based on one or more financial factors of the user, wherein the one or more factors include a spending habit, a saving habit, an age, an income, a shopping subscription, a social media posting, a bankruptcy, or any combination thereof.

5. The method of claim 1 further comprising:
   generating a selectable list of parameters affecting the first digital reputation score; and
   creating a visual representation that demonstrates one or more changes in the first digital reputation score as the parameters are selected and deselected,
   wherein the visual representation is specific to a specified country and/or state.

6. The method of claim 1 further comprising displaying a representation of the alternative item with a hyperlink to an identified complementary item.

7. The method of claim 1 further comprising displaying an indication of one or more coupons identified for use with the alternative item.

8. The method of claim 1 further comprising displaying an alternative time and/or date to purchase the alternative item, wherein a purchase of the alternative item at the alternative time and/or date have been determined to result in a higher digital reputation score.

9. The method of claim 1 further comprising masking, based on a user preference information collected from a payment card, the collected information about the first item from an identity of the user, thereby preventing purchase information from being mapped back to the user.

10. The method of claim 1 further comprising:
    determining a location of the user via information gathered from the portable electronic device; and
    displaying an alternative location to purchase the alternative item, wherein purchase of the alternative item at the alternative location has been determined to result in a higher digital reputation score than the second digital reputation score.

11. The method of claim 1, further comprising displaying a recommendation for an additional item to be purchased with the alternative item.

12. A non-transitory computer-readable medium storing instructions that, when executed by a computing system, cause the computing system to perform a process for managing a digital reputation of a user by suggesting alternative purchases, the process comprising:
    collecting, via a portable electronic device, information identifying a first item for purchase, wherein the information identifying the first item is collected by at least one of: scanning a bar code on the first item, obtaining a photo of the first item, or collecting contents of a shopping cart including the first item;
    providing, to a remote server, the information identifying the first item for purchase, wherein the remote server determines a first digital reputation score indicative of a first effect of the first item on a digital reputation of the user;
    receiving the first digital reputation score indicative of the first effect of the first item on the digital reputation of the user;
    identifying, via the portable electronic device, information on an alternative item for purchase;
    sending, to the remote server, the information on the alternative item, wherein the remote server determines a second digital reputation score indicative of a second effect of the alternative item on the digital reputation of the user;
    receiving the second digital reputation score indicative of the second effect of the alternative item on the digital reputation of the user; and displaying, on the portable electronic device, the first digital reputation score and the second digital reputation score.

13. The non-transitory computer-readable medium of claim 12, wherein the first and second digital reputation scores are based on one or more financial factors of the user, wherein the one or more factors include a spending habit, a saving habit, an age, an income, a shopping subscription, a social media posting, a bankruptcy, or any combination thereof.

14. The non-transitory computer-readable medium of claim 12, wherein the process further comprises:
generating a selectable list of parameters affecting the first digital reputation score; and
creating a visual representation that demonstrates one or more changes in the first digital reputation score as the parameters are selected and deselected.

15. The non-transitory computer-readable medium of claim 12, wherein the process further comprises displaying an alternative time and/or date to purchase the alternative item, wherein a purchase of the alternative item at the alternative time and/or date have been determined to result in a higher digital reputation score.

16. The non-transitory computer-readable medium of claim 12, wherein the process further comprises:
determining a location of the user via information gathered from the portable electronic device; and
displaying an alternative location to purchase the alternative item, wherein purchase of the alternative item at the alternative location has been determined to result in a higher digital reputation score than the second digital reputation score.

17. A computing system comprising:
one or more processors; and
one or more memories storing instructions that, when executed by the one or more processors, cause the computing system to perform a process comprising:
collecting, via a portable electronic device, information identifying a first item for purchase, wherein the information identifying the first item is collected by at least one of: scanning a bar code on the first item, obtaining a photo of the first item, or collecting contents of a shopping cart including the first item;
providing, to a remote server, the information identifying the first item for purchase, wherein the remote server determines a first digital reputation score indicative of a first effect of the first item on a digital reputation of the user;
receiving the first digital reputation score indicative of the first effect of the first item on the digital reputation of the user;
identifying, via the portable electronic device, information on an alternative item for purchase;
sending, to the remote server, the information on the alternative item, wherein the remote server determines a second digital reputation score indicative of a second effect of the alternative item on the digital reputation of the user;
receiving the second digital reputation score indicative of the second effect of the alternative item on the digital reputation of the user; and
displaying, on the portable electronic device, the first digital reputation score and the second digital reputation score.

18. The computing system of claim 17, wherein the first and second digital reputation scores are based on one or more financial factors of the user, wherein the one or more factors include a spending habit, a saving habit, an age, an income, a shopping subscription, a social media posting, a bankruptcy, or any combination thereof.

19. The computing system of claim 17, wherein the process further comprises:
generating a selectable list of parameters affecting the first digital reputation score; and
creating a visual representation that demonstrates one or more changes in the first digital reputation score as the parameters are selected and deselected.

20. The computing system of claim 17, wherein the process further comprises displaying an alternative time, location, and/or date to purchase the alternative item, wherein a purchase of the alternative item at the alternative time, location, and/or date have been determined to result in a higher digital reputation score.

* * * * *